(12) United States Patent
Sekiguchi (10) Patent No.: US 11,279,099 B2
(45) Date of Patent: Mar. 22, 2022

(54) PUNCTURE REPAIR FLUID CONTAINER AND PUNCTURE REPAIR KIT

(71) Applicant: The Yokohama Rubber Co., LTD., Tokyo (JP)

(72) Inventor: Takumi Sekiguchi, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 16/970,337

(22) PCT Filed: Dec. 21, 2018

(86) PCT No.: PCT/JP2018/047263
§ 371 (c)(1),
(2) Date: Aug. 14, 2020

(87) PCT Pub. No.: WO2019/159536
PCT Pub. Date: Aug. 22, 2019

(65) Prior Publication Data
US 2021/0078268 A1    Mar. 18, 2021

(30) Foreign Application Priority Data

Feb. 15, 2018    (JP) .............................. JP2018-025158

(51) Int. Cl.
*B29C 73/02*    (2006.01)
*B60S 5/04*    (2006.01)

(52) U.S. Cl.
CPC .............. *B29C 73/025* (2013.01); *B60S 5/04* (2013.01)

(58) Field of Classification Search
CPC ........ B29C 73/025; B29C 73/166; B60S 5/04
(Continued)

(56) References Cited

U.S. PATENT DOCUMENTS

| 4,073,314 A | 2/1978 | Speelman et al. |
| 5,704,590 A | 1/1998 | Pfeiffer |

(Continued)

FOREIGN PATENT DOCUMENTS

| DE | 1 727 426 | 8/1956 |
| DE | 6942438 | 1/1973 |

(Continued)

OTHER PUBLICATIONS

International Search Report for International Application No. PCT/JP2018/047263 dated Apr. 2, 2019, 2 pages, Japan.

*Primary Examiner* — Jason K Niesz
(74) *Attorney, Agent, or Firm* — Thorpe North & Western (57) ABSTRACT

A puncture repair fluid container includes: a container body including a storage portion for storing a puncture repair fluid and an opening portion provided at one end of the storage portion; and a cap mounted to the opening portion. The cap includes: an introduction path for introducing compressed air from outside; a discharge path for discharging the puncture repair fluid to the outside; a switching valve for switching two paths disposed between the introduction path and the discharge path; and a switching knob for operating the switching valve. The switching knob includes a disk-like switching knob body provided with a tab portion protruding in a thickness direction of the switching knob body, and a maximum height position at which a height of the tab portion is maximum is positioned outward of a center position of the switching knob body in a radial direction of the switching knob body.

6 Claims, 11 Drawing Sheets

(58) Field of Classification Search
USPC .......................................................... 141/38
See application file for complete search history.

(56) References Cited

U.S. PATENT DOCUMENTS

| | | |
|---|---|---|
| 2004/0094552 A1 | 5/2004 | Featherston et al. |
| 2010/0084403 A1 | 4/2010 | Popish et al. |
| 2010/0108185 A1* | 5/2010 | Chou .................... B29C 73/166 |
| | | 141/38 |
| 2011/0309094 A1 | 12/2011 | Bodum |
| 2015/0158257 A1* | 6/2015 | Wang ........................ B60S 5/04 |
| | | 141/38 |
| 2020/0180247 A1 | 6/2020 | Sekiguchi |

FOREIGN PATENT DOCUMENTS

| | | |
|---|---|---|
| DE | 196 00 642 | 4/1997 |
| JP | 2014-125240 | 7/2014 |
| JP | 3212106 | 8/2017 |
| JP | 2017-177389 | 10/2017 |
| WO | WO 2010/003259 | 1/2010 |
| WO | WO 2017/169538 | 10/2017 |

* cited by examiner

PUNCTURE REPAIR FLUID CONTAINER AND PUNCTURE REPAIR KIT

TECHNICAL FIELD

The present technology relates to a puncture repair fluid container and a puncture repair kit and more specifically to a puncture repair fluid container and a puncture repair kit that enable a switching knob to rotate easily at the time of puncture repair work by devising a shape of the switching knob.

BACKGROUND ART

In recent years, when a tire mounted on a vehicle is punctured, a puncture repair fluid is injected into the tire via a tire valve to temporarily repair the puncture. Examples of a device that allows such a temporary repair include a puncture repair kit. Employing a puncture repair kit eliminates the need to provide the vehicle with a spare tire, which makes it possible to save resources and reduce the weight of the vehicle. There is also a further advantage that the space in the vehicle where the spare tire would have been provided can be used for other purposes.

Known puncture repair kits include, for example, a so-called pump-type puncture repair kit that injects a puncture repair fluid stored in a puncture repair fluid container into a tire by compressed air supplied from an air compressor or the like (refer to Japan Unexamined Patent Publication No. 2017-177389, for example). A puncture repair fluid container used in such a pump-type puncture repair kit includes: a container body including a storage portion that stores the puncture repair fluid and an opening portion provided at one end of the storage portion; and a cap mounted to the opening portion of the container body. Further, an introduction path that introduces compressed air from the outside and a discharge path that discharges the puncture repair fluid to the outside are provided is provided to the cap. Further, in some cases, a flow path that allows only compressed air to pass therethrough between the introduction path and the discharge path; and a flow path that sends out the puncture repair fluid together with the compressed air are disposed in the cap, and a switching valve that switches the two flow paths is provided. In a case of such a puncture repair fluid container, there arises a problem in that a switching knob for operating the switching valve is less likely to rotate when the hermeticity of the switching valve is high.

SUMMARY

The present technology provides a puncture repair fluid container and a puncture repair kit that enable a switching knob to rotate easily at the time of puncture repair work by devising a shape of the switching knob.

A puncture repair fluid container includes: a container body including a storage portion for storing puncture repair fluid and an opening portion provided at one end of the storage portion; and a cap being mounted to the opening portion, the cap including: an introduction path for introducing compressed air from outside; a discharge path for discharging the puncture repair fluid to the outside; a switching valve for switching two paths disposed between the introduction path and the discharge path; and a switching knob for operating the switching valve. The switching knob includes a switching knob body provided with a tab portion, the switching knob body having a disk-like shape and the tab portion protruding in a thickness direction of the switching knob body, and a maximum height position at which a height of the tab portion is maximum is positioned outward of a center position of the switching knob body in a radial direction of the switching knob body.

A puncture repair kit includes: the container described above in which a puncture repair fluid is stored; a hose for introducing the puncture repair fluid into a tire, the hose being connected to the container; and a compressor for suppling compressed air for feeding the puncture repair fluid in the container through the hose.

In the present technology, a switching knob body forming the switching knob is provided with a tab portion that protrudes in the thickness direction of the switching knob body. Thus, when the switching knob is operated at the time of puncture repair work, the switching knob can be rotated easily by gripping the tab portion provided to the switching knob. Here, a structure in which the maximum height position of the tab portion is at the center position of the switching knob body or the height of the tab portion is constant is disadvantageous in gripping the tab portion to rotate the switching knob. Thus, the tab portion is provided so that the maximum height position of the tab portion is positioned outward of the center position of the switching knob body in the radial direction of the switching knob body. With this, a force of rotating the tab portion is more likely to be transmitted to the switching knob, which can rotate the switching knob easily.

In the present technology, a part or the entirety of the tab portion is preferably disposed outward of an outer diameter of the switching knob body in the radial direction of the switching knob body. Generally, when the switching knob itself is increased in size, the switching knob is easy to be gripped, which is advantageous in rotating the switching knob. However, when the switching knob itself is increased in size, storage and cost performance tends to be deteriorated. Thus, with the tab portion thus configured, a force of rotating the tab portion can be transmitted effectively to the switching knob while suppressing degradation in storage and cost performance. Thus, the switching knob can be rotated more easily.

In the present technology, the switching knob body preferably includes at least one of a recessed portion and a protruding portion, and the tab portion preferably includes a protruding portion or a recessed portion that is fitted in or to the recessed portion or the protruding portion of the switching knob main body. With this, the tab portion is attachable as required. Further, unintentional rotation of the switching knob can be prevented during storage.

BRIEF DESCRIPTION OF DRAWINGS

FIGS. 10A and 10B illustrate one example of a puncture repair kit according to an embodiment of the present technology, in which

DETAILED DESCRIPTION

Figure 3:
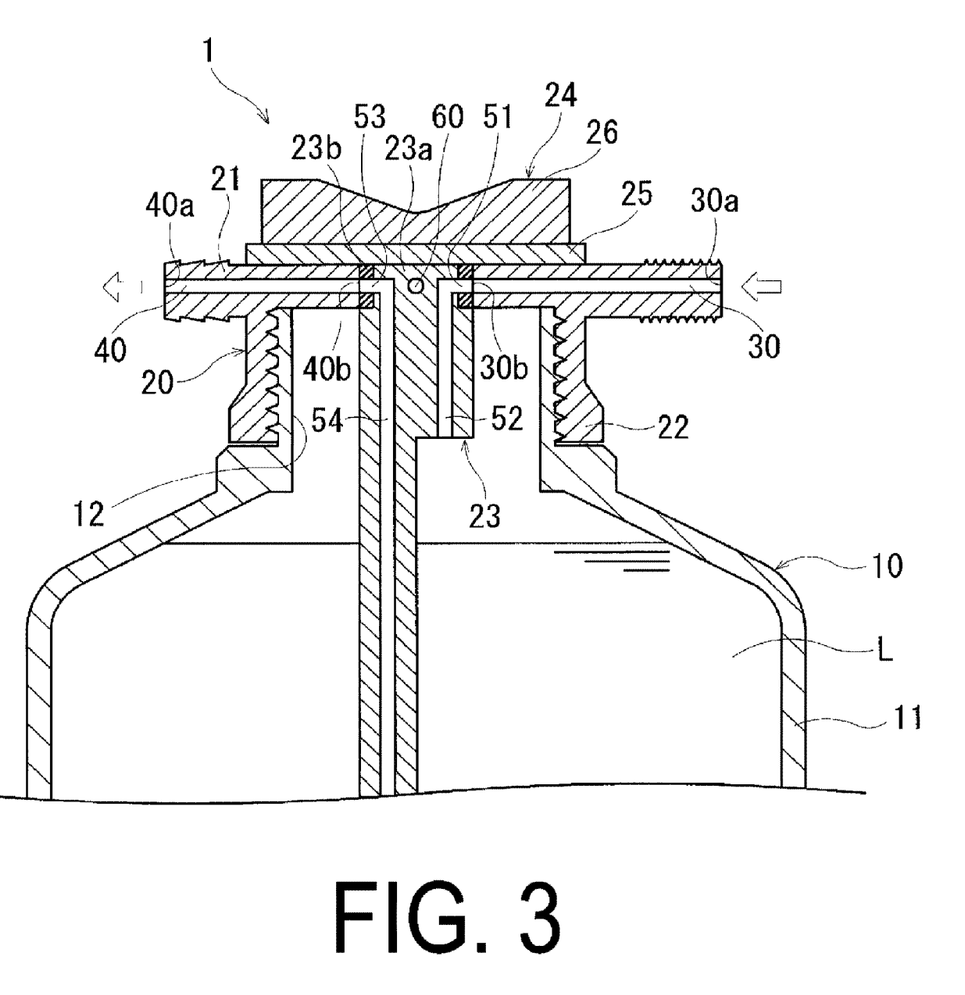
FIG. 3 is an enlarged view of a region at or near a cap, illustrating one example of a state in which a first flow path of the puncture repair fluid container in FIG. 1 is released.
Figure 4:
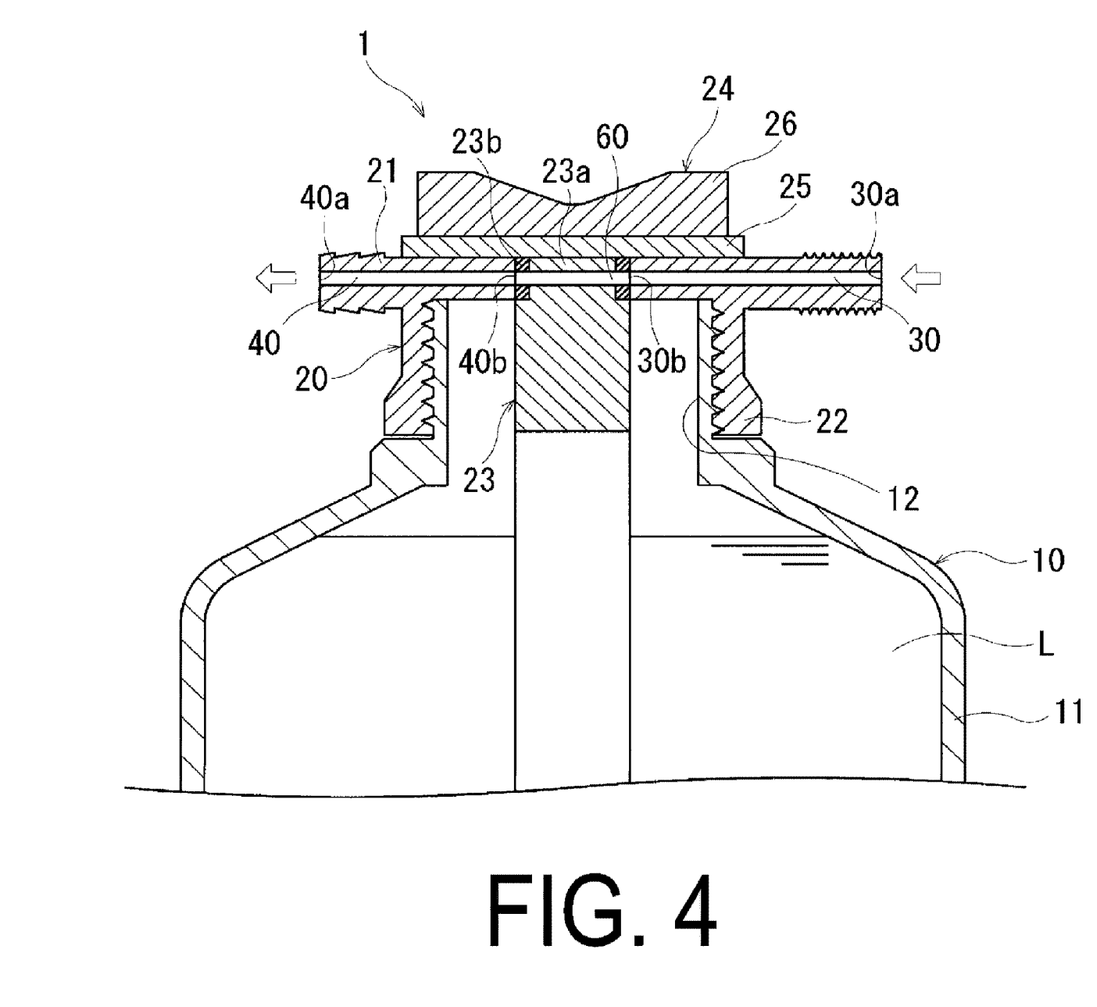
FIG. 4 is an enlarged view of the region at or near the cap, illustrating one example of a state in which a second flow path of the puncture repair fluid container in FIG. 1 is released.
Figure 5:
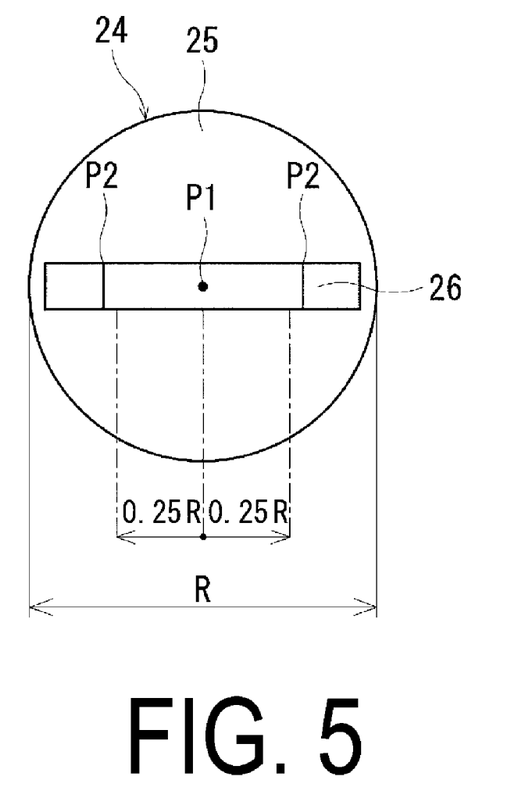
FIG. 5 is a plan view illustrating a switching knob of the puncture repair fluid container in FIG. 1.

Configurations of embodiments of the present technology will be described in detail below with reference to the accompanying drawings. FIG. 1 to FIG. 4 illustrate a puncture repair fluid container according to an embodiment of the present technology. FIG. 5 illustrates a switching knob of the puncture repair fluid container according to the embodiment of the present technology.

Figure 1:
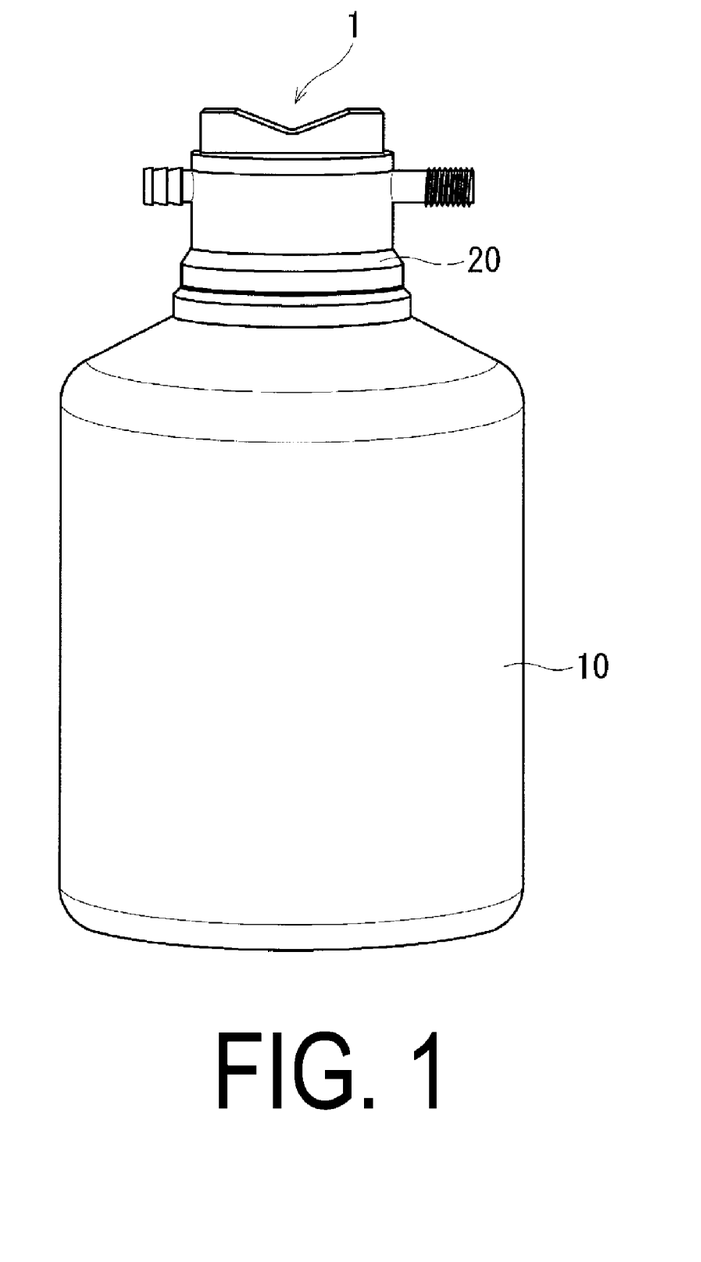
FIG. 1 is a perspective view illustrating one example of a puncture repair fluid container according to an embodiment of the present technology.
Figure 2:
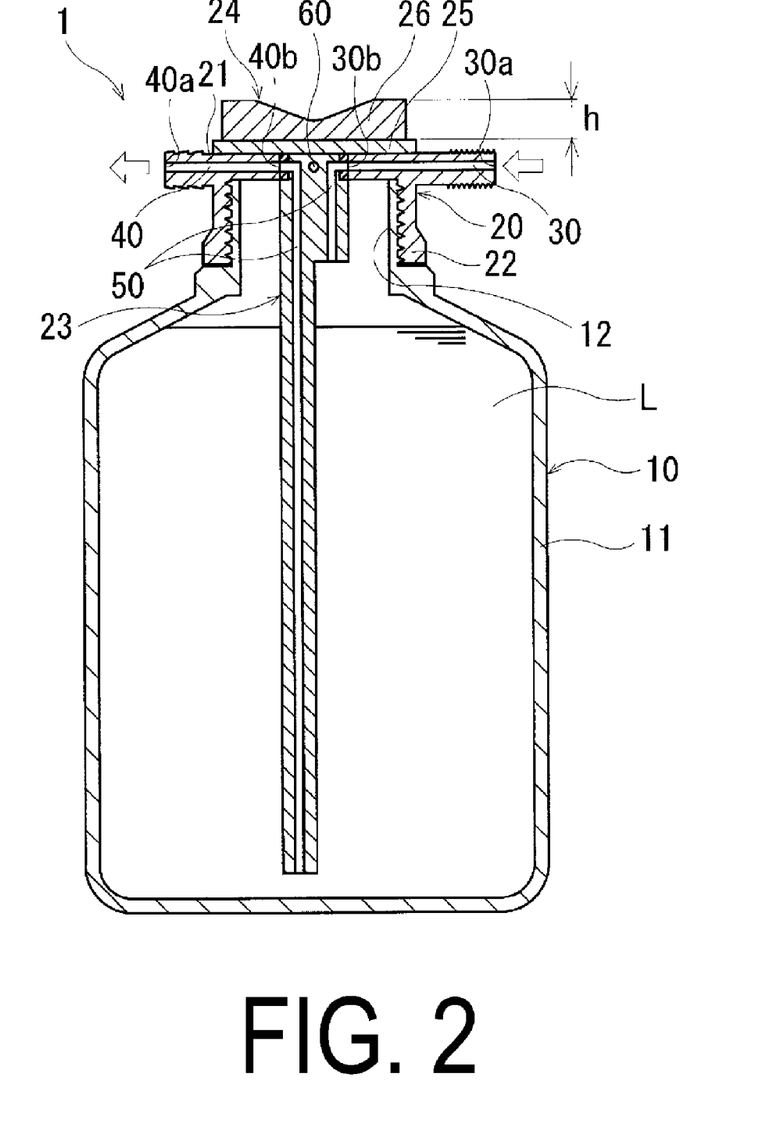
FIG. 2 is a cross-sectional view of the puncture repair fluid container in FIG. 1.

As illustrated in FIG. 1 and FIG. 2, a puncture repair fluid container 1 (hereinafter, referred to as "container 1") according to the present technology includes a container body 10 and a cap 20. A hose that connects the container 1 to a high-pressure air feed device and a hose that connects the container 1 to a tire are not particularly limited in the present technology, and hence detailed description therefor is omitted in FIG. 1 and FIG. 2.

As illustrated in FIG. 1 and FIG. 2, the container body 10 includes: a storage portion 11 having a cylindrical shape that stores a puncture repair fluid L containing, for example, rubber latex; and an opening portion 12 having a cylindrical shape that is positioned on a side of an upper part of the storage portion 11 when the container body 10 stands upright and that discharges the puncture repair fluid L at the time of use. When the container 1 stands upright, a bottom surface of the storage portion 11 is positioned on a side opposite the opening portion 12. In the present embodiment, a screw thread is formed on an outer circumferential surface of the opening portion 12, which allows engagement with a screw thread on the cap 20 described later. The storage portion 11 and the opening portion 12 are integrally formed of, for example, a synthetic resin such as polypropylene or polyethylene. The opening portion 12 may be sealed with, for example, a film (not illustrated) before the cap 20 is mounted to prevent the deterioration of the puncture repair fluid L and leakage from the opening portion 12.

The cap 20 includes a cap body 21, a mounting portion 22, a switching valve 23, and a switching knob 24. The cap body 21 having a substantially cylindrical shape is provided with an introduction path 30 that introduces compressed air from the outside of the container 1 and a discharge path 40 that discharges the puncture repair fluid L in the container 1. The mounting portion 22 has a substantially cylindrical shape having the same outer diameter as that of the cap body 21, and the screw thread that is engaged with the screw thread on the opening portion 12 is formed on an inner circumferential surface.

The introduction path 30 is a flow path that extends in the cap body 21 in a direction orthogonal to an axis of the container 1. The introduction path 30 has an opening end 30a that opens to the outside of the container 1 and an opening end 30b that opens to the inside of the cap 20 (the cap body 21). The opening end 30a of the introduction path 30 protrudes from the cap body 21 and has a shape that enables coupling with the hose for connecting the container 1 to the feed device.

The discharge path 40 is a flow path that extends in the cap body 21 in the direction orthogonal to the axis of the container 1. The discharge path 40 has an opening end 40a that opens to the outside of the container 1 and an opening end 40b that opens to the inside of the cap 20 (the cap body 21). The opening end 40a of the discharge path 40 protrudes from the cap body 21 and has a shape that enables coupling with the hose for connecting the container 1 to the tire.

The switching valve 23 is a valve for switching the two flow paths disposed between the introduction path 30 and the discharge path 40. The switching valve 23 includes a valve body 23a having a columnar shape and a sealing body 23b having a cylindrical shape that exerts sealability. An annular groove is provided in an outer circumferential surface of the valve body 23a so that the sealing body 23b is fitted therein. The sealing body 23b is fitted in this groove to obtain the switching valve 23. As the material of the sealing body 23b, rubber is exemplified. A first flow path 50 and a second flow path 60 are provided to the valve body 23a and the sealing body 23b, respectively. Both the first flow path 50 and the second flow path 60 pass through the valve body 23a and the sealing body 23b.

The first flow path 50 is a flow path for sending the puncture repair fluid L together with compressed air between the introduction path 30 and the discharge path 40. As illustrated in FIG. 3, the first flow path 50 includes: straight portions 51 and 53 that extend in the direction orthogonal to the axis of the container 1; and branch portions 52 and 54 that extend from ends of the straight portions 51 and 53 in the axial direction of the container 1. The other ends of the straight portions 51 and 53 have a shape that enables coupling with the opening end 30b of the introduction path 30 and the opening end 40b of the discharge path 40, respectively. The branch portion 54 extends to the inside of the container body 10, and reaches a region at or near the bottom surface of the container body 10 (the storage portion 11). At the time of puncture repair work, the puncture repair fluid L is sent to the discharge path 40 via the branch portion 54. Further, instead of causing the branch portion 54 to extend to the region at or near the bottom surface of the container body 10, a tube extending to the inside of the container body 10 may be mounted. In this case, the material of the tube is not particularly limited, and polyvinyl chloride and soft polyethylene are exemplified.

The second flow path 60 is a flow path that allows only compressed air to pass therethrough between the introduction path 30 and the discharge path 40. As illustrated in FIG. 4, the second flow path 60 is a flow path that extends in the valve body 23a and the sealing body 23b in the direction orthogonal to the axis of the container 1. The second flow path 60 has one end capable of being coupled to the opening end 30b of the introduction path 30 and the other end capable of being coupled to the opening end 40b of the discharge path 40.

The switching knob 24 is a gripping member for operating the switching valve 23. The switching knob 24 includes a switching knob body 25 having a disk-like shape and a tab portion 26. The tab portion 26 protrudes upward when the container body 10 stands upright. As illustrated in FIG. 5, in the tab portion 26, the center position of the switching knob body 25 is indicated with P1, and the maximum height position at which a height h of the tab portion 26 (see FIG. 2) is maximized is indicated with P2. In this case, the maximum height position P2 of the tab portion 26 is positioned outward of the center position P1 of the switching knob body 25 in the radial direction of the switching knob body 25. That is, the height h of the tab portion 26 at the center position P1 of the switching knob body 25 is smaller than the maximum height. Particularly, the maximum height position P2 may be positioned outward of a position corresponding to 25% of an outer diameter R of the switching knob body 25 in the radial direction with the center position P1 as a reference point. The height h of the tab portion 26 is preferably set to a range of from 10 mm to 15 mm so that the tab portion 26 can be gripped easily. Note that the height h of the tab portion 26 is a height from an upper end surface of the switching knob body 25 to an upper end of the tab portion 26.

When the container 1 is used to perform puncture repair work, the tab portion 26 provided to the switching knob 24 is operated to rotate the switching valve 23. With this, switching between the first flow path 50 and the second flow path 60 can be performed. That is, switching between a state in which the first flow path 50 is released (the state in FIG. 3) and a state in which the second flow path 60 is released (the state in FIG. 4) is performed. At the time of storing the container 1, the second flow path 60 remains released. Thus, at the time of performing puncture repair work, the tab portion 26 is operated to release the first flow path 50. With this, the puncture repair fluid L can be sent to the discharge path 40 together with compressed air.

In the puncture repair fluid container described above, the switching knob body 25 forming the switching knob 24 is provided with the tab portion 26 that protrudes in the thickness direction of the switching knob body 25. Thus, when the switching knob 24 is operated at the time of puncture repair work, the switching knob 24 can be rotated easily by gripping the tab portion 26 provided to the switching knob 24. Here, a structure in which the maximum height position P2 of the tab portion 26 is at the center position P1 of the switching knob body 25 or the height h of the tab portion 26 is constant is disadvantageous in gripping the tab portion 26 to rotate the switching knob 24. Thus, the tab portion 26 is provided so that the maximum height position P2 of the tab portion 26 is positioned outward of the center position P1 of the switching knob body 25 in the radial direction of the switching knob body 25. With this, a force of rotating the tab portion 26 is more likely to be transmitted to the switching knob 24, which can rotate the switching knob 24 easily.

Figure 6A:
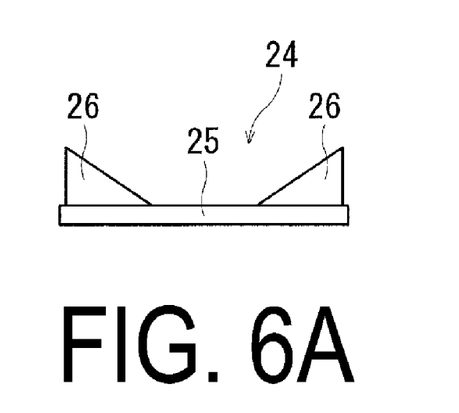
FIGS. 6A and 6B are side views of modification examples, illustrating the switching knob of the puncture repair fluid container according to the embodiment of the present technology.
Figure 6B:
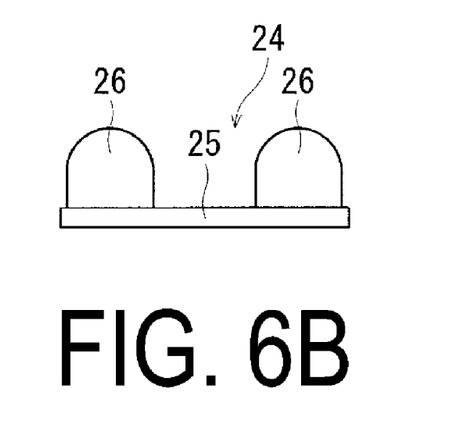

In the embodiment described above in FIG. 1 to FIG. 5, the example in which the tab portion 26 has a substantially M-like shape having a recess at the center of the tab portion 26 in a cross-sectional view is given. However, the shape of the tab portion 26 is not particularly limited. In addition to the shape illustrated in FIG. 1 to FIG. 5, a pair of the tab portions 26 each having a triangular shape as illustrated in FIG. 6A and a pair of the tab portions 26 each having a semi-circular distal end as illustrated in FIG. 6B may be adopted.

Figure 7A:
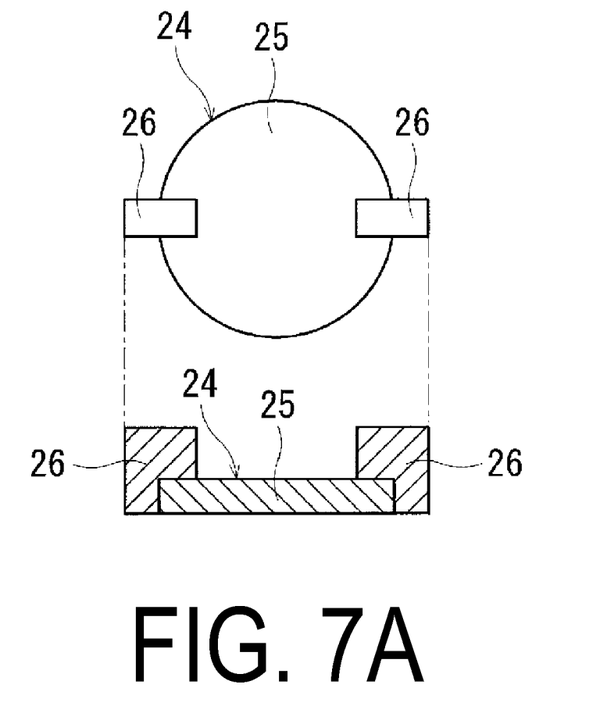
FIGS. 7A-7B illustrate other modification examples of the switching knob of the puncture repair fluid container according to embodiments of the present technology, in which the upper part is a plan view of the switching knob and the lower part is a cross-sectional view taken along a radial direction of the switching knob.
Figure 7B:
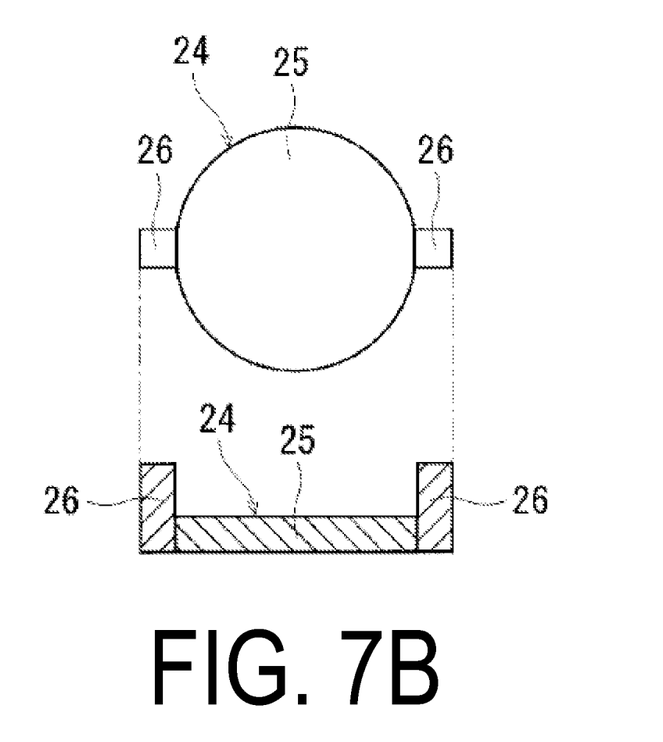

FIGS. 7A-7B illustrate other modification examples of the switching knob of the puncture repair fluid container according to embodiments of the present invention. As illustrated in FIG. 7A, each of a pair of the tab portions 26 is partially disposed outward of the outer diameter of the switching knob body 25 in the radial direction of the switching knob body 25. As illustrated in FIG. 7B, each of a pair of the tab portions 26 is entirely disposed outward of the outer diameter of the switching knob body 25 in the radial direction of the switching knob body 25. That is, in these embodiments the parts or entirety of the tab portions 26 protrude outward of the switching knob body 25 in the radial direction. With the tab portion 26 thus configured, a force of rotating the tab portion 26 can be transmitted effectively to the switching knob 24 while suppressing degradation in storage and cost performance. Thus, the switching knob 24 can be rotated more easily. Further, the pair of tab portions 26 may be disposed at positions that are point symmetric to each other with respect to the center of the switching knob body 25 as a reference.

Figure 8:
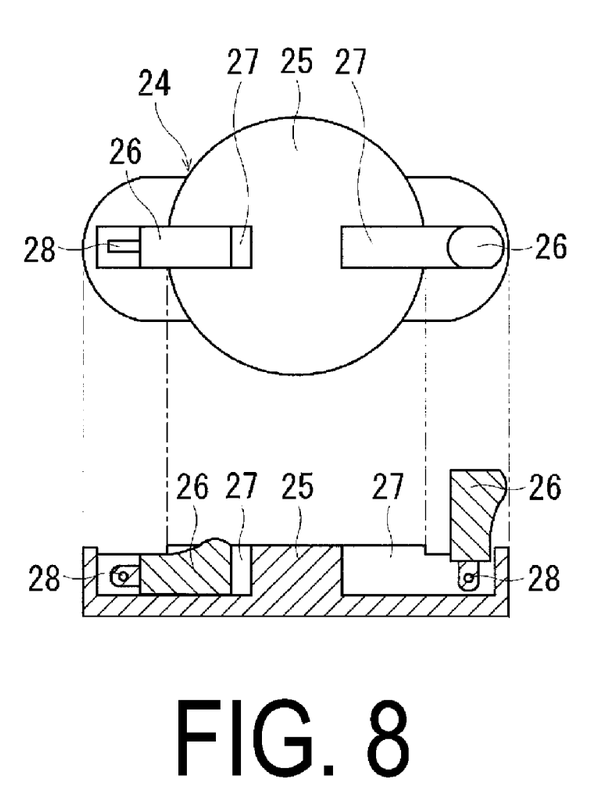
FIG. 8 illustrates another modification example of the switching knob of the puncture repair fluid container according to the embodiment of the present technology in which the upper part is a plan view of the switching knob and the lower part is a cross-sectional view taken along the radial direction of the switching knob.

FIG. 8 illustrates another modification example of the switching knob of the puncture repair fluid container according to the embodiment of the present technology. As illustrated in FIG. 8, a pair of reception portions 27 for receiving a pair of the tab portions 26 are provided in the switching knob body 25. The reception portions 27 are provided as recessed portions in the surface of the switching knob body 25, and a rotary mechanism 28 rotatable about an axis of the tab portions 26 is provided. The tab portions 26 can be received in the switching knob body 25. Note that FIG. 8 illustrates a state in which the pair of tab portions 26 are received in the reception portions 27 and a usable state for puncture repair work, respectively.

Figure 9:
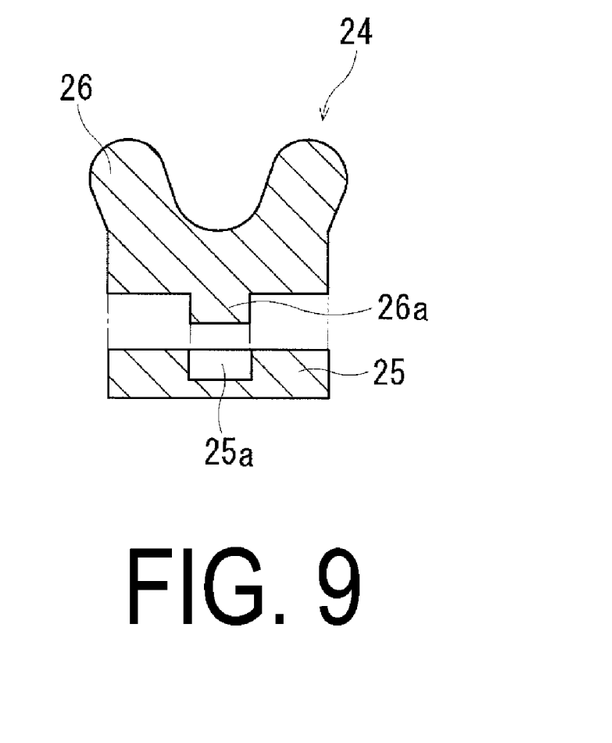
FIG. 9 is a cross-sectional view illustrating another modification example of the switching knob of the puncture repair fluid container according to the embodiment of the present technology.

FIG. 9 illustrates another modification example of the switching knob of the puncture repair fluid container according to the embodiment of the present technology. As illustrated in FIG. 9, one recessed portion or protruding portion 25a (in FIG. 9, the recessed portion) is provided to the surface of the switching knob body 25. At the same time, a protruding portion or recessed portion 26a (in FIG. 9, the protruding portion), which is fitted to or in the recessed portion or protruding portion 25a of the switching knob body 25, is provided to the tab portion 26. The tab portion 26 includes two distal ends protruding upward when the container body 10 stands upright, and each of the distal ends has a semi-circular shape. With the switching knob body 25 and the tab portion 26 thus configured, the tab portion 26 is attachable as required. At the same time, unintentional rotation of the switching knob 24 can be prevented during storage.

Further, in the embodiment in FIG. 9, the example in which the recessed portion is formed in the switching knob body 25 and the protruding portion is formed on the tab portion 26 is given, but the present technology is not limited thereto. A protruding portion may be provided on the switching knob body 25 and a recessed portion fitted to the protruding portion of the switching knob body 25 may be provided in the tab portion 26. Note that the number and the shape of the recessed portion or the protruding portion 25a of the switching knob body 25 are not particularly limited, and a number and shape may be freely selected.

Figure 10A:
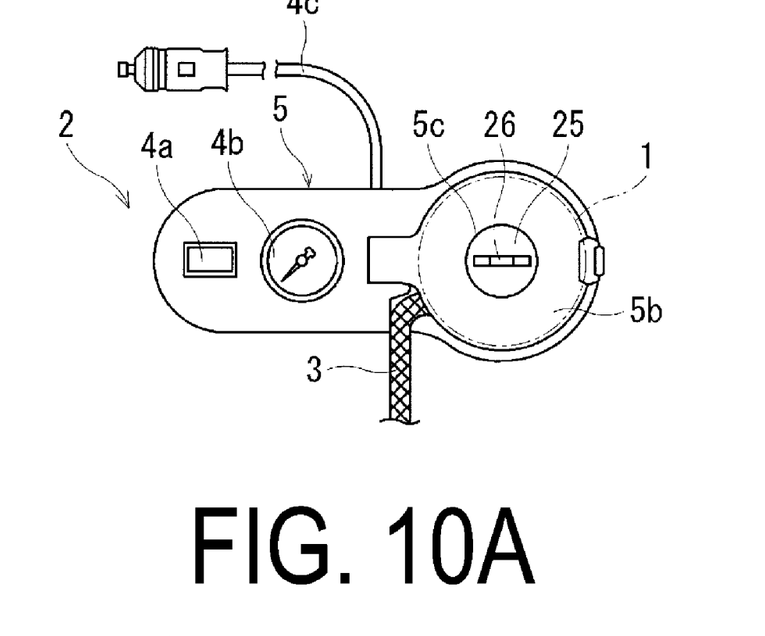
FIG. 10A is a plan view and FIG. 10B is a cross-sectional view taken along an extension direction of the puncture repair kit.
Figure 10B:
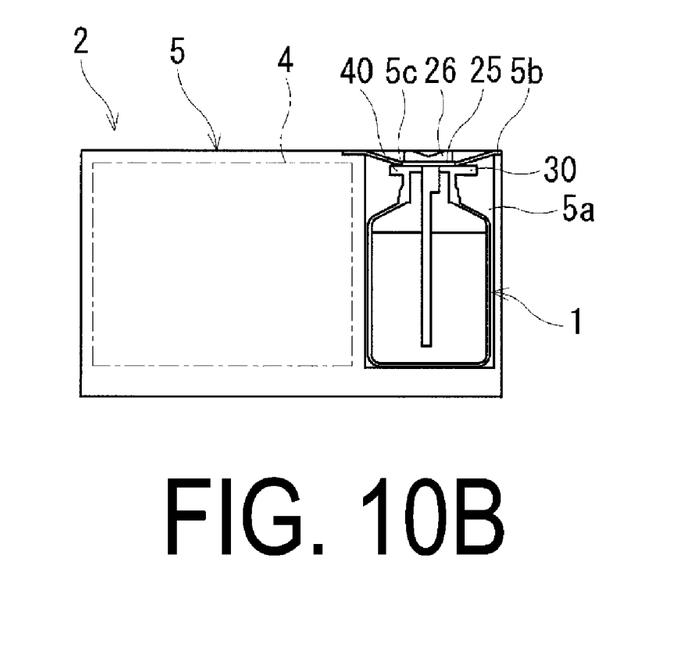

FIGS. 10A and 10B illustrate one example of a puncture repair kit according to an embodiment of the present technology. As illustrated in FIGS. 10A and 10B, a puncture repair kit 2 includes: a hose 3 that is connected to the container 1 via the discharge path 40 and that introduces the puncture repair fluid L into a tire; and a compressor 4 that supplies compressed air for feeding the puncture repair fluid L through the hose 3. The compressor 4 is integrally incorporated inside a casing 5. A pressure gauge 4b and a switch 4a of the compressor 4 are disposed on the upper part of the casing 5, and a power cable 4c that is connected to the compressor 4 and supplies electric power is disposed on a side surface of the casing 5. Further, a bottle reception portion 5a for receiving the container 1 and a lid portion 5b for covering the container 1 are formed on the casing 5. The lid portion 5b is mounted to the casing 5 in a swingable manner and has a through-hole 5c at a position corresponding to the switching knob 24. Further, under a state of being received in the bottle reception portion 5a, the container 1 is connected to the compressor 4 via the introduction path 30.

In the present embodiment, when the container 1 is received in the bottle reception portion 5a, the tab portion 26 protrudes from the through-hole 5c of the lid portion 5b. Thus, at the time of puncture repair work, the tab portion 26 can be operated to rotate the switching valve 23. It is demanded that the tab portion 26 be reduced in size as much as possible in order to obtain the puncture repair kit 2 having a compact structure. By devising the structure of the tab portion 26, the operation of the switching valve 23 can be performed easily.

The invention claimed is:

1. A puncture repair fluid container, comprising:
a container body comprising a storage portion for storing a puncture repair fluid and an opening portion provided at one end of the storage portion; and
a cap being mounted to the opening portion, the cap comprising:
an introduction path for introducing compressed air from outside;
a discharge path for discharging the puncture repair fluid to the outside;
a switching valve for switching two paths disposed between the introduction path and the discharge path; and
a switching knob for operating the switching valve, wherein
the switching knob comprises a switching knob body provided with a tab portion, the switching knob body having a disk-like shape and the tab portion protruding in a thickness direction of the switching knob body,
a maximum height position at which a height of the tab portion is maximum is positioned outward of a center position of the switching knob body in a radial direction of the switching knob body, and
an entirety of the tab portion is disposed outward of an outer diameter of the switching knob body in the radial direction of the switching knob body.

2. A puncture repair kit, comprising:
a container for storing a puncture repair fluid according to claim 1;
a hose for introducing the puncture repair fluid into a tire, the hose being connected to the container; and
a compressor supplying compressed air for feeding the puncture repair fluid in the container through the hose.

3. The puncture repair fluid container according to claim 1, wherein the switching knob body comprises at least one of a recessed portion or a protruding portion, and the tab portion comprises a protruding portion or a recessed portion that is fitted in or to the recessed portion or the protruding portion of the switching knob main body.

4. A puncture repair kit, comprising:
a container for storing a puncture repair fluid according to claim 3;
a hose for introducing the puncture repair fluid into a tire, the hose being connected to the container; and
a compressor supplying compressed air for feeding the puncture repair fluid in the container through the hose.

5. A puncture repair fluid container, comprising:
a container body comprising a storage portion for storing a puncture repair fluid and an opening portion provided at one end of the storage portion; and
a cap being mounted to the opening portion, the cap comprising:
an introduction path for introducing compressed air from outside;
a discharge path for discharging the puncture repair fluid to the outside;
a switching valve for switching two paths disposed between the introduction path and the discharge path; and
a switching knob for operating the switching valve, wherein
the switching knob comprises a switching knob body provided with a tab portion, the switching knob body having a disk-like shape and the tab portion protruding in a thickness direction of the switching knob body,
a maximum height position at which a height of the tab portion is maximum is positioned outward of a center position of the switching knob body in a radial direction of the switching knob body,
the switching knob body comprises at least one of a recessed portion or a protruding portion, and the tab portion comprises a protruding portion or a recessed portion that is fitted in or to the recessed portion or the protruding portion of the switching knob main body.

6. A puncture repair fluid container, comprising:
a container body comprising a storage portion for storing a puncture repair fluid and an opening portion provided at one end of the storage portion; and
a cap being mounted to the opening portion, the cap comprising:
an introduction path for introducing compressed air from outside;
a discharge path for discharging the puncture repair fluid to the outside;
a switching valve for switching two paths disposed between the introduction path and the discharge path; and
a switching knob for operating the switching valve, wherein
the switching knob comprises a switching knob body provided with a tab portion, the switching knob body having a disk-like shape and the tab portion protruding in a thickness direction of the switching knob body,
a maximum height position at which a height of the tab portion is maximum is positioned outward of a center position of the switching knob body in a radial direction of the switching knob body,
a reception portion for receiving the tab portion is provided in the switching knob body,
the reception portion is recessed in a surface of the switching knob body,
a rotary mechanism rotatable about an axis of the tab portion is provided, and the tab portion is rotatable about the axis using the rotary mechanism to be received in the reception portion of the switching knob body.

\* \* \* \* \*